Patented June 19, 1945

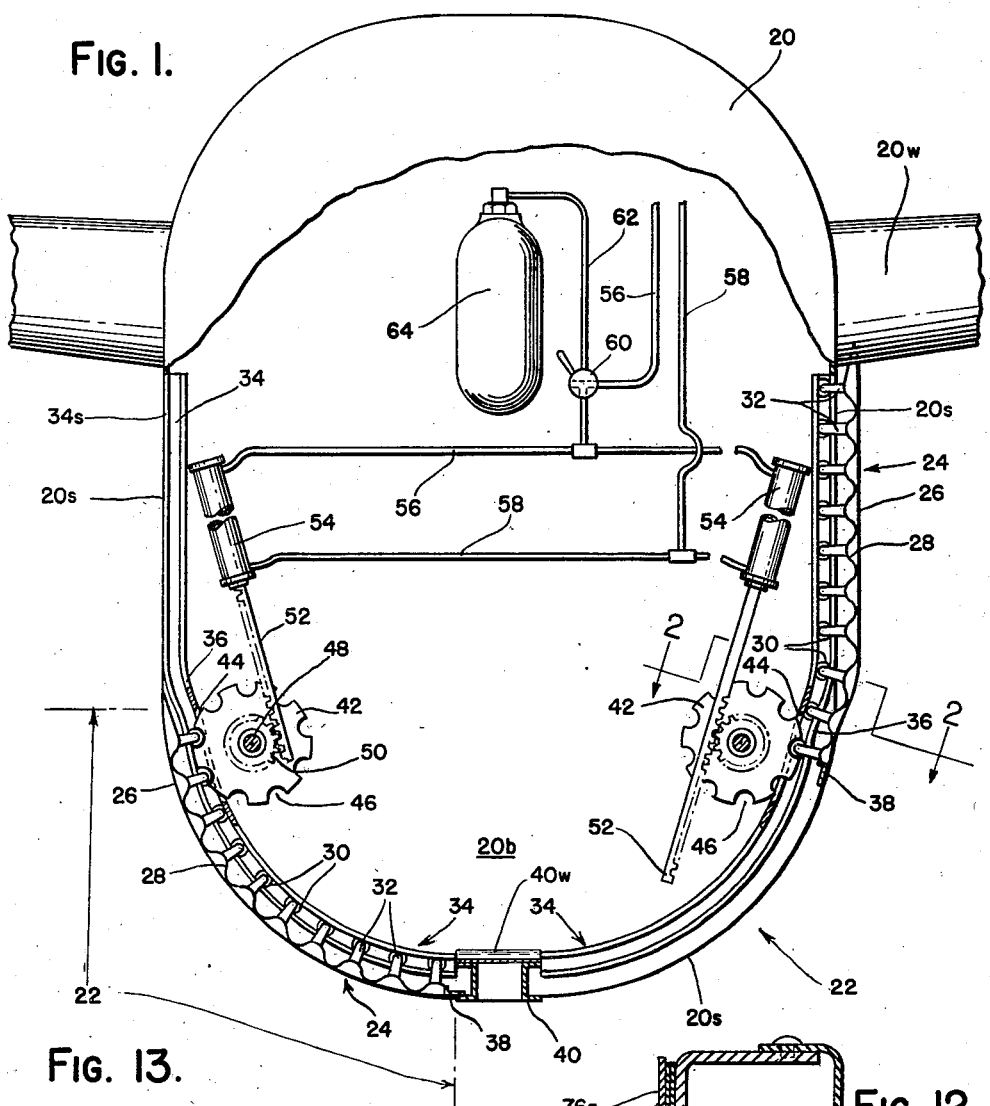

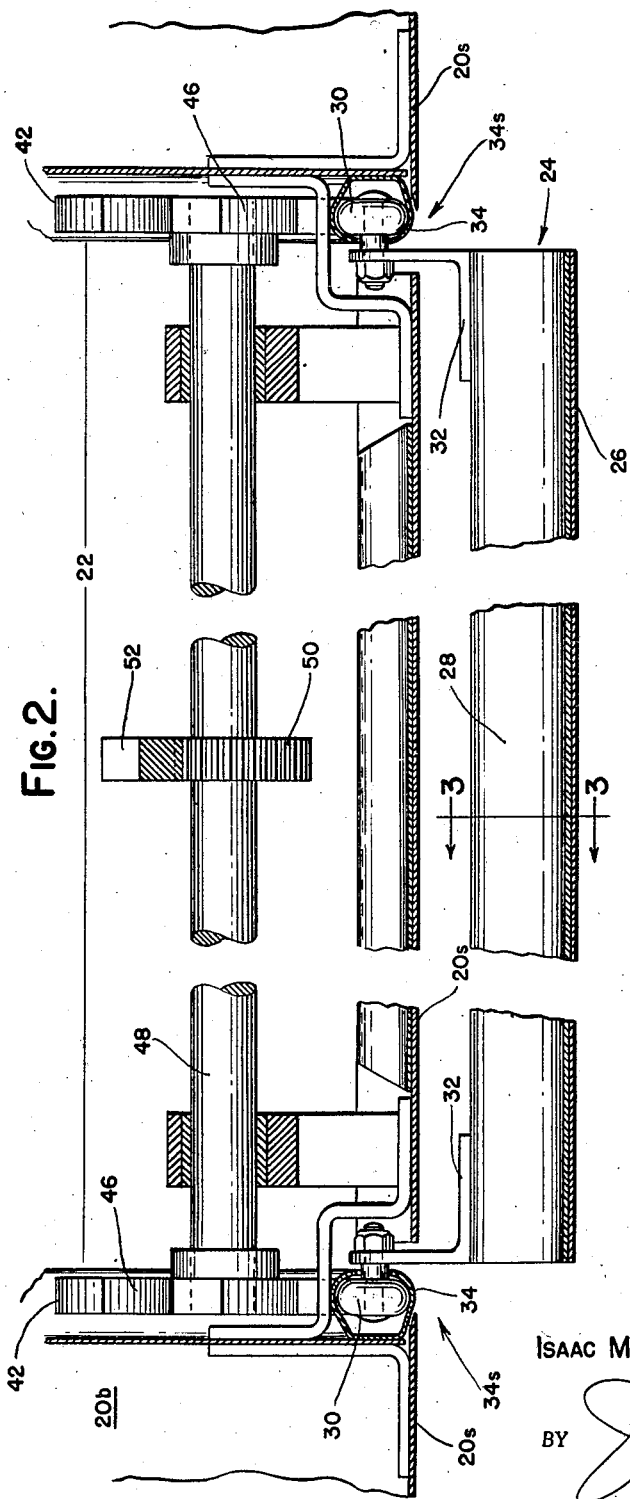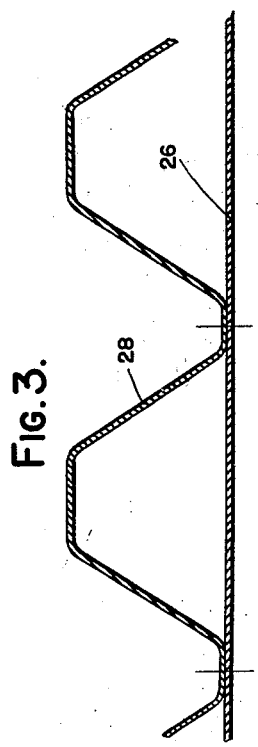

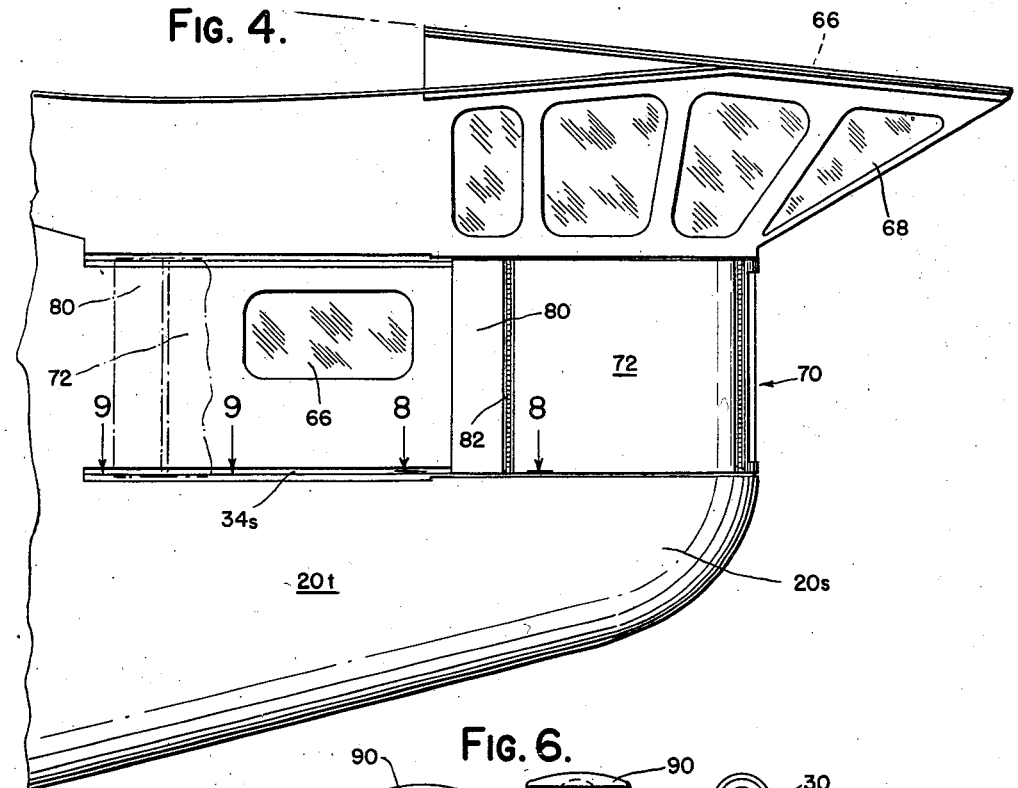
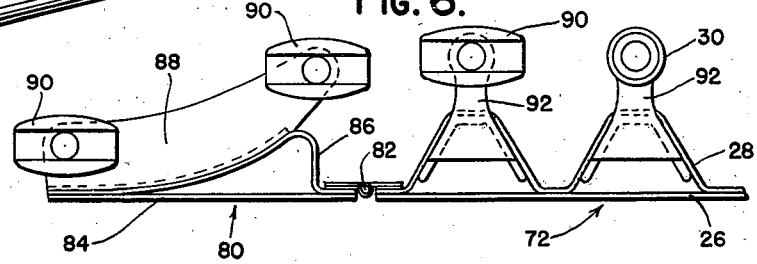
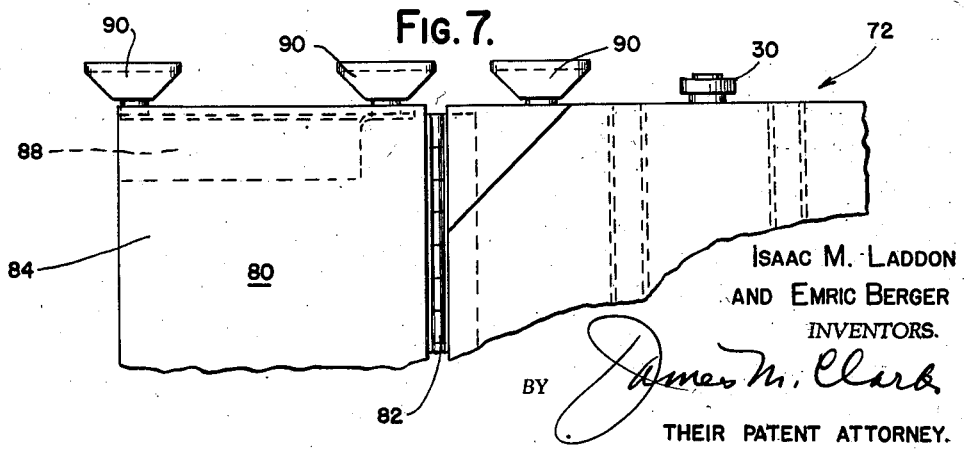

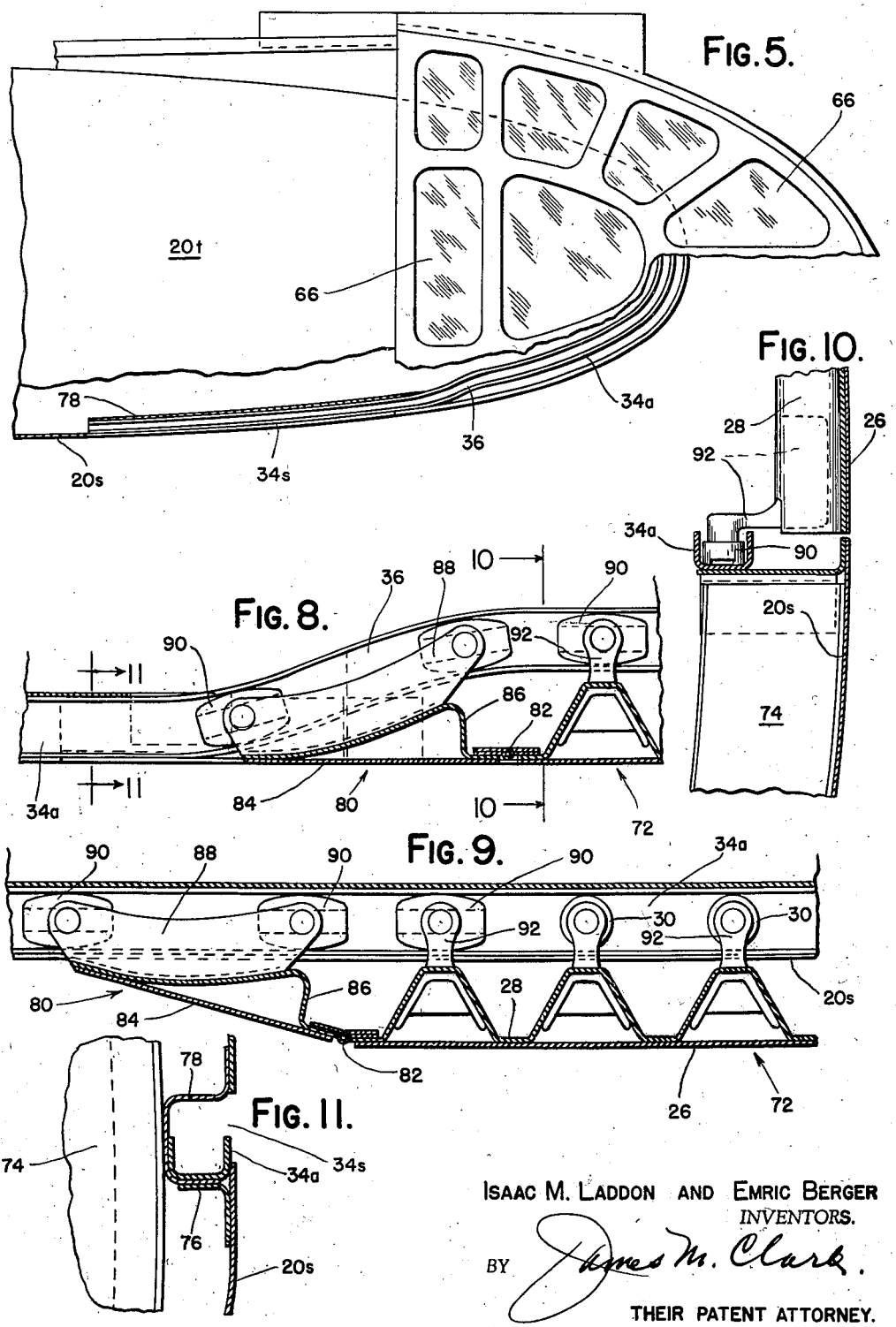

2,378,856

UNITED STATES PATENT OFFICE 2,378,856

SLIDING CLOSURE FOR AIRCRAFT

Isaac M. Laddon and Emric Berger, San Diego, Calif., assignors to Consolidated Vultee Aircraft Corporation, a corporation of Delaware Application February 6, 1941, Serial No. 377,592

13 Claims. (Cl. 160—209)

The present invention relates to airplanes and other high-speed vehicles and more particularly to closure means for openings in the surfaces of such vehicles.

It is well known that the trend of design in streamline bodies is toward simplification and refinement of the external surfaces by eliminating wherever possible all projections and depressions which would interfere with the smooth flow of the fluid stream over the body. In aircraft this trend was early evidenced by the provision of complete retractability for landing gears and other appurtenances. In military aircraft, the bombs and guns were first carried entirely exposed to the relative wind but were subsequently submerged within the aircraft skin to the fullest extent possible. In the case of bombs it is, of course, quite feasible to carry them entirely within the aircraft skin, and as is now common practice they may be carried in special compartments equipped with hinged doors through which the bombs can be loaded and subsequently released during flight.

Doors previously employed for the purpose have usually been of the split type operated in pairs. Some opened by folding inwardly and upwardly into the aircraft body and in doing so occupied considerable space that might better have been utilized for other purposes. Other doors opened by pivoting downward into the relative wind and the resulting drag, even though the door was hinged in such fashion as to present its narrowest section to the airflow, was of serious proportions. When such doors are opened there is a loss of speed and ceiling and a very objectionable effect on flight stability. The delay occasioned by the time required to stabilize the airplane before the bombs can be dropped is particularly serious at high speeds when great distances are covered in a relatively small space of time.

Accordingly, it is an object of this invention to overcome these difficulties by providing closure means for use in conjunction with access openings which when opened have a minimum effect on the stability or flight characteristics of an airplane.

A further important object is to provide a curvilinear closure for an opening in a curved surface which normally serves as a continuous part of the surface but which can be moved out of the opening and along the surface to a remote position.

Still another object is the provision of a closure member which can be moved out of a flush fit within an opening to a remote position as the result of a single sliding motion and to accomplish this the invention contemplates the use of a flexible panel arrangement of novel construction.

A still further object is to provide a track arrangement cooperating with such a closure means to slide the same around and close to the surface so as to reduce the air resistance to a minimum when operated to uncover the opening. This invention also provides a fairing unit automatically cooperating with such a closure means to fair the same in the case where the closure is so mounted as to move out into the relative airstream when operated to uncover the opening.

Another object is to provide a novel mounting means and power operating mechanism for a flexible flush sliding door.

With the foregoing and other objects in view the invention consists in the construction, combination and arrangement of parts hereinafter described and illustrated in the accompanying drawings, in which:

Fig. 1 is a transverse sectional view of an airplane fuselage showing one arrangement of the improved closures and an operating mechanism for the same;

Fig. 2 is a cross-sectional plan view taken on the line 2—2 of Fig. 1;

Fig. 3 is a cross-section as might be taken on the line 3—3 of Fig. 2 showing a modified form of construction for a flexible closure panel;

Fig. 4 is a side elevation showing an alternate embodiment of the present invention;

Fig. 5 is a plan view, partly in section, of the same embodiment with the closures removed;

Fig. 6 is a view looking downward on the end portion of the closure unit incorporated in Fig. 4;

Fig. 7 is a side elevation of a corner of the same closure unit;

Fig. 8 is a sectional plan taken on the line 8—8 of Fig. 4;

Fig. 9 also is a sectional plan taken on the line 9—9 of Fig. 4, but with the door in its forward position;

Fig. 10 is a track section taken on the line 10—10 of Fig. 8;

Fig. 11 is a second track section taken on the line 11—11 of Fig. 8;

Fig. 12 shows an alternate form of track construction; and

Fig. 13 shows the arrangement of a flush closure for an opening in a flat surface, the opening being uncovered.

Referring to the accompanying drawings, it should be noted that the embodiments chosen to illustrate the present invention show the slidable closure members as moving to an external disposition with respect to the aircraft when operated to uncover the openings with which they are associated. It is equally within the scope of this invention that these closure members be arranged to move to an internal disposition. However, the former disposition has been chosen to gain greater interior space and avoid interference with whatever equipment or conduits are supported on the interior walls of the structure since it is believed that this consideration outweighs the slightly increased but temporary drag resulting from the positioning of these members in the relative wind and, as will appear later, the invention embraces a means of minimizing such drag as does result.

In Fig. 1 there is diagrammatically shown a rearward section taken through the body of a high mid-wing monoplane 20 at the portion thereof adapted to carry a load of bombs or other cargo, the wing being indicated at 20w. In the bottom of this body at 20b are openings 22 permitting the loading and discharge of such cargo as is the purpose of this invention, these openings being equipped with sliding closure members or doors 24. In this figure the doors are employed in pairs and for the purpose of illustration one door is shown in open attitude while the other is shown closed, although it is contemplated that they would preferably be operated in unison. Inasmuch as these closure members operate over a non-uniformly curved path, and when closed form a continuous part of the curved surface of the aircraft, it is readily recognized that they must be of a flexible construction. This requirement is met by the employment of a composite panel made up as shown in Fig. 3 of a smooth, flexible outer sheet 26 and a corrugated inner sheet 28 which are preferably welded together along the meeting line of the corrugations with the outer sheet 26. This construction forms a flexible panel that is bendable in a direction parallel to the corrugations and is therefore capable of assuming either a curved or rectilinear disposition. The corrugations may be formed in the angular shape shown in Fig. 3 or more nearly in a sinusoidal form as indicated in Fig. 1.

The flexible panel 24 is mounted by means or rollers 30 carried on the ends of L-shaped members 32 attached to successive corrugations as shown in Figs. 1 and 2. Track members or guideways 34 are provided in which the rollers operate, there being track members 34 at opposite sides of each closure panel 24. These track members are preferably of channel section and are suitably supported adjacent the aircraft skin on the inner side thereof so as to straddle the opening 22 and to extend upward beyond the upper edge thereof for a distance at least equivalent to the width of the opening. Fig. 12 shows a form of track member 34a as used in a production application of this invention. This member 34a is connected to the aircraft skin 20s by angle strips 76a and 78a.

Those portions of the guideways 34 adjacent the openings 22 are exactly duplicative of the local aircraft skin curvature at each point and are spaced inward a sufficient distance so that the smooth outer surface of the panel 24 will be perfectly flush with the adjoining exterior surface of the aircraft skin 20s. With the panel fitting flush in the opening it obviously could not be slid directly to one side to uncover the opening for it would strike the edge thereof. This apparent difficulty is obviated by providing a local offset or reverse curve at 36 in each track member which causes the end of the panel contiguous to the upper edge of the opening to move outward and thus clear the edge. The curved offset portion 36 in each track member 34 has the effect of a cam in imparting an outward movement to the closure panel 24 as it is moved upwardly along the track such that it clears the edge of the adjacent fixed skin portion 20s. Above the track portion 36, the track can again preferably follow the local curvature of the aircraft skin 20s in close proximity within its surface and to the slot 34s in the skin by means of which the L-shaped members 32 extend through the skin and have access to the track. By having the track members 34 close to the skin the door 24 moves outward far enough so as to clear it in its sliding along the track and it thus moves from a flush position in the closed attitude to an external spaced position when opened. When the door panel moves into closed position a striker plate 38 along its lower edge engages a flange 40 on the central structural member in the bottom of the aircraft and a tight fit is thus insured.

The top of the member 40 is bridged by a corrugated strip 40w along its length which serves as a catwalk providing communication between the front and rear compartments within the aircraft, this passageway running between the bomb racks.

When doors of this type are employed in bomb bays it is very desirable that a means of power operation be provided. In Fig. 1 is shown one form of operating mechanism. Mounted near the portion 36 of each track member is a cog wheel 42 extending through a slot 44 into the interior of the track member. The periphery of each cog wheel is provided with indentations 46 of a size and spacing adapted to receive successive rollers 30 as the wheel rotates. However, in a production application of this invention the indentations 46 of the cog wheel receive the head of each roller bracket 32 which is shaped as in Fig. 10. Two cog wheels are provided for each door and these are splined on the ends of a shaft or torque tube 48, journalled in suitable supports as shown, which carries an attached fixed spur gear 50. Meshing with this gear is a toothed rack 52 which upwardly terminates in a piston rod extending into an hydraulic servo cylinder 54 adapted to cause back and forth movements of the rack. Since the bomb bay doors are operated in pairs a duplicate mechanism as just described would be provided for each door and the cylinders 54 of each would be connected into the same hydraulic circuit. Alternatively the doors may be operated by having fluid or electric motors operate the cog wheels 42 or the cog wheels by means of attached drums, may be cable operated by a fluid jack or any other suitable type of motor.

Such a circuit may be of any suitable arrangement to selectively allow pressure fluid to be directed through the pipes 56 and 58 to either end of the cylinders to move the racks 52 to open or shut the doors 24 respectively. Included in the line 56, in which pressure causes opening of the doors, is a two-way valve 60 connected by piping 62 to a pressure accumulator 64, or alternately by means of a three-way valve to a hand pump (not shown). The purpose of this auxiliary equipment is to provide means for operating the doors in a manner well known even if the primary source of power should fail.

Referring now to Figs. 4 and 5 for an alternate embodiment of the present invention it may be seen that it is equally adapted for use as a sliding enclosure for a tail gun compartment or a closure for any access opening. In the drawings is shown the rear end 20*t* of an aircraft in which is fitted a gun compartment. Observation and sighting windows 66 and 68 are provided at convenient locations with respect to a horizontal opening 70 adapted for the traverse of a gun or for the escape of the gunner. In order to close up the opening on either side of the gun, the same general type of flexible, flush mounted panel is employed as previously described.

Turning to Fig. 6 it may be seen that this panel has a smooth outer sheet 26 and a corrugated backing 28. It also has other dissimilar details, however, and is therefore designated by the number 72 in Figs. 4 to 11 inclusive. Essentially the same track arrangement composed of two internally formed members 34*a* is employed with an intermediate offset portion 36 adjacent the forward edge of the opening 70. The camming effect of the curved offset portion 36 upon the slide members 90 through the intermediacy of the brackets 86—88 is such that as the fairing member 80, comprising the portions 84—86, is moved longitudinally to the left from its "closed" position as viewed in Fig. 8 to the "open" position shown in Fig. 9, the fairing member 80 is displaced and tilted laterally and outwardly such that its forward portion clears the trailing edge of the fixed skin portion 20*s* passing outside of the same with a minimum of clearance as indicated in Fig. 9. Rearward of this offset portion where the opening 70 is straddled by the track, they are likewise spaced inward a sufficient distance, see Fig. 10, to bring the surface 26 of the panel in flush alignment with the exterior of the aircraft skin 20*s*. Likewise, forward of the intermediate portion, the track members are located immediately within the surface of this skin as shown in Fig. 11 for the same reasons as previously explained. They are mounted on successive structural bulkheads 74 and are partially enclosed and supported by means of angle strips 76 and 78.

The operation of these flexible doors 72 with respect to the track and the opening is exactly as described before in connection with the doors 24. However, in the particular arrangement for the bomb bay doors shown in Fig. 1, when the doors are opened and subjected to the relative wind very little surface is presented to be impinged upon by the flow which merely passes along the channels afforded by the longitudinal corrugations. Very little drag is created and no large reactions occur to cause damage to the door units. But, in the arrangement shown in Fig. 4 et seq. the case is entirely reversed as the corrugations now run vertically and present an appreciable area to the force of the relative wind. For this reason it is necessary to provide a fairing which will automatically come into action whenever the door panel is opened and projected into the relative wind.

To this end each closure panel 72 is provided at its forward end with a rigid panel section or fairing piece 80 articulated to the flexible panel by means of a piano type hinge 82. This fairing comprises a smooth outer sheet 84 and a curved reinforcing member 86 welded together and to the hinge leaf. At the upper and lower edges of the fairing 80 are attached curved brackets 88 each serving to carry two pivotally mounted elongated slide members 90 which take the place of rollers. Such slide members 90 are also attached to the first corrugations of the closure panels 72 by means of brackets 92. The purpose in using these slide members instead of rollers is to provide a certain amount of rigidity and freedom from play at the end of the closure unit since the elongated shape is adapted to turn slightly and thus bridge the width of the track. By making contact with both sides of the track members more support is obtained. Also, the slide members are designed for taking end thrust, parallel to the corrugations, more satisfactorily than the rollers. The slide members have the same clearance as the rollers to the width of the internally formed track members. Other brackets 92 extend from the ends of the remaining corrugations but on these are mounted rollers 30. Both the rollers 30 and the slide members 90 operate in the guideways 34*a* and thus carry out their function of mounting and adapting the flexible closure panel 72 for sliding movement.

It will be noticed in Fig. 9 that the conformation of the bracket 88 is such as to position the left hand slide member 90 relatively close to the fairing panel 84 while the other member 90 is positioned a greater distance away but yet at a lesser spacing than is found between the rollers 30 and the flexible panel sheet 26. The purpose of this arrangement is to cause the fairing panel 80 to automatically carry out its functional purpose. As seen in Fig. 9 this spacing of the slides 90 requires that the panel 80 assume an angular relationship with respect to the remainder of the closure 72 whenever the unit is positioned in a portion of the track 34*a* which is straight or of uniform curvature. It may be seen that the forward end of the panel 80 is in close proximity to the aircraft skin 20*s* and it is therefore able to deflect the relative wind outward and around the exterior of the closure element. In this way the enclosure of the gun compartment is maintained, the accompanying drag is materially reduced and there is no opportunity for damage to occur to the closure unit due to air forces. This fairing position of the panel 80 is adopted in the present installation whenever the closure with its hingedly attached panel 80 moves away from the closed position shown in Fig. 8 to some such position as is indicated in dotted lines in Fig. 4. Returning to a consideration of Fig. 8, it is obvious that the special conformation of the track member portion 36 together with the arrangement of the bracket 88 causes the panel 80 to align itself with the general exterior shape assumed by the flexible panel 28 whenever the slides 90 lie in the guideway portion 36. When this occurs the panel 80 is also in flush conformity with the immediately adjacent portions of the aircraft skin 20*s* and the whole closure unit acts as an integral part of the streamlined aircraft skin.

This sliding closure unit could also be power operated by a mechanism as shown in Fig. 1 or by one of some other type in which case the operating controls might be linked to the gun in such manner that the gun movements operate the controls directly to cause the sliding closure to automatically follow swinging movements of the gun as it is traversed in the opening 70. Actually, in the particular single gun installation shown in Figs. 4 to 11 inclusive, the doors are intended to be operated by hand. A gun may be pointed rearwardly between two slightly open doors with negligible drag, in which case swiveling of the gun to the right and left will cause the doors to open by direct contact of the gun. Once opened it is necessary in this particular installation to use manual means to close the doors. As stated, the single gun operates between the doors but when not in use is retracted to a longitudinal position with the barrel extending through a hole in the two latched and closed doors.

Fig. 13 shows a sliding door 95 mounted in an opening 94 in a flat plane surface of a land, water or air vehicle. In the rearward or closed position the face of the door 95 is flush and continuous with the adjacent flat surface 93 of the vehicle. The arrow indicates the direction of the relative wind impinging on the fairing panel 96.

In describing the present invention, its application to aircraft has been shown exclusively in the drawings but nevertheless it is equally well adapted for use in any body having openings which it is desired to provide with a slidable closure. However, the greatest benefits are derived when it is employed in connection with high-speed vehicles in which it can form, to all intents and purposes, an integral part of the streamlined skin. Therefore the scope of this invention is to be determined solely by the scope of the appended claims whereby,

We claim:

1. In an enclosed streamlined body having an opening in the walls thereof, a flexible sliding door, attached mounting means offset from the surface of said door, track members adapted to receive said mounting means, the said track members being spaced inwardly from the said body wall adjacent opposed edges of said opening and having an offset portion curving into close proximity to the said walls beyond the area of the opening whereby said sliding door is adapted to be slid from a flush position in continuity with said walls in which it closes said opening to an external spaced disposition displaced from said opening and a component hinged part of said door operatively associated with said track members adapted to be tilted by said offset portion to clear said wall edges and to automatically fair said door in all positions thereof.

2. In a streamlined body surface, a curvilinear door unit comprised of a main portion and an end portion hinged thereto, offset mounting devices attached to both said portions, the mounting devices attached to the main portion having the some magnitude of offset, the mounting devices attached to the end portion having a decreasing magnitude of offset in a direction away from the main portion, guide members receiving said mounting devices comprised of portions duplicating the local curvature of the body surface and of portions of dissimilar curvature neutralizing the effect of said decreasing offset at a certain position of the door whereby said end portion is aligned with said main portion only when its mounting devices lie in guide member portions of said dissimilar curvature.

3. In a streamlined body surface, a door installation comprising a flush fitting door unit, guides extending within the body surface, means mounting said door unit on said guides for reciprocable movement therealong, the said guides being formed to direct the door unit out of continuity with the body surface to a position external thereof during door opening movements and means carried by said door unit in operative engagement with said guides whereby the said means is adapted to move into a fairing position with respect to the door as the latter moves into its open position.

4. In a streamlined body surface, a door unit serving as part of the surface envelope, track members disposed substantially parallel to the said surface, mounting means supporting the door unit for displacement along the tracks to a spaced disposition out of the surface envelope, a component part of the door unit adapted to fair the resulting gap between the door unit and the body surface, and track mounted means for the part operating as a result of such displacement to cause movement of the component part into fairing position.

5. In a streamlined body surface, a curvilinear installation comprising a flush fitting closure unit, guide means extending within the body surface, means mounting said closure unit within said guide means adapted to facilitate sliding of said unit longitudinally along said guide means to an uncovered position in the relative airstream outside said body surface, an adjustable portion hinged to and comprising a part of the said closure unit, an offset curved section in said guide means and means mounting said adjustable portion such that as said closure unit is moved longitudinally through said curved offset section said adjustable portion is moved from an aligned position with said closure unit to an adjusted position in which it fairs said closure unit in said uncovered position.

6. In an enclosed streamlined body having an opening in the walls thereof, a flexible sliding closure having a hinged portion, attached mounting means offset from the surface of said closure, track members adapted to receive the said mounting means, the said track members being offset inwardly from the plane of said body wall at said opening and having a curved offset section in close proximity to the said walls beyond the area of said opening whereby said sliding closure is adapted to be moved from a flush position in continuity with said walls in the closed condition of said opening to an externally spaced disposition outside said adjacent wall surface in which said hinged portion effectively fairs said sliding closure.

7. In an aircraft structure having an opening in the external skin surface thereof, a pair of channel guides submerged within said skin surface having communication with the exterior thereof, the said guides being disposed in inwardly spaced parallelism adjacent two opposed longitudinally extending edges of said opening and in more closely spaced parallelism with the adjacent skin surface, a flexible closure externally disposed with respect to said skin surface supported for longitudinal sliding movement within said guides, said guides each having an offset section disposed in the region of a transverse edge of said opening at said adjacent skin surface, said closure being of flexible composite construction adapted to conform to the plane of the skin surface as defined by said guide, an end portion articulated to said flexible closure supported from said offset guide section such that said portion is continuous with said closure and said adjacent skin surface in the closed condition of said opening and is tilted upon longitudinal sliding movement through said offset section whereby it forms a fairing for a transverse edge of said flexible closure in its opened position.

8. In an aircraft structure having an access opening in the external skin surface, a pair of guides submerged within the adjacent skin surface having communication through longitudinal slots with the exterior thereof, the said guides being spaced along the longitudinal edges of said opening and extending in more closely spaced relationship with respect to said slot in said adjacent skin surface, the said guides having an offset portion adjacent a transverse edge of said opening between its more widely and closely spaced portions with respect to said skin surface, a flexible closure of composite construction supported for longitudinal sliding movement in said guides externally disposed with respect to said skin surface, means for longitudinally sliding said closure from a closed position within said opening in which it is flush and continuous with said skin surface to an outwardly displaced open position adjacent said slotted skin surface, and an end portion articulated to said flexible closure supported from said guides in flush position and continuous with said closure in its closed position and has its free edge tilted closely contiguous to the adjacent skin surface to form a fairing in the opened position of said closure.

9. In an enclosed aircraft fuselage having an opening in the wall surface thereof, track members disposed on the inner surface of the fuselage wall extending parallel to opposed longitudinal edges of said opening, the said track members being offset adjacent a transverse edge of said opening and extending in inwardly spaced parallelism to the said opposed edges of said opening throughout the width thereof, a flexible composite closure mounted to operate in said track members being movable from a closed position within the opening in flush continuity with the surface of the fuselage wall along said track members to a displaced position outwardly spaced from the adjacent fuselage wall, a fairing portion hinged to the forward lateral edge of said closure, said track offset being relatively positioned adjacent said lateral edge of the opening whereby it causes said fairing portion to clear the fuselage surface upon opening thereby tiltably fairing the exposed edge of said closure, and to slide into flush continuity with said closure in the closed condition of said opening.

10. In a streamlined body surface having an opening through the surface envelope thereof, a flexible door unit serving as part of said surface envelope in the closed condition of said opening, guide means disposed beneath the body surface in substantial parallelism therewith but having portions disposed at varying depths with interconnecting offset sections of said guide means joining the said portions, the said portions being disposed at a greater depth adjacent said opening than at the adjacent body surface, mounting means supporting said door unit for displacement from said closed position along said guide means with resultant movements out of flush continuity with the body surface, the said guide means adapted to maintain the flexible door unit in substantial conformation to the local curvature of the body surface lying adjacent thereto in any displaced position and fairing means carried by said door unit interconnected with said guide means adapted upon movement through said offset sections to fair itself into the adjacent body surface when so displaced.

11. In a vehicle body wall having an opening therein, a closure assembly for said opening serving as a continuous portion of said body wall, longitudinally extending guide means disposed adjacent said opening and more closely adjacent to said adjacent body wall, mounting means supporting said closure assembly for longitudinal displacement along said guide means to an open position outside said body wall, a component portion of said closure assembly adapted to close the resulting gap between said closure assembly and the outside of said body wall and track mounted means for said component closure portion actuated by said longitudinal displacement of said closure assembly to close said gap in the open position of said closure.

12. In a vehicle body wall having an opening therein, a closure assembly for said opening serving as a continuous portion of said body wall, elongated guide means including an offset portion disposed adjacent said opening and more closely to said adjacent body wall, mounting means supporting said closure assembly for displacement along said guide means to an open position outside said body wall, a component portion of said closure assembly adapted to close the resulting gap between said closure assembly and the outside of said body wall and track mounted means for said component closure portion actuated by said displacement of said closure assembly through said offset section to close said gap in the open position of said closure.

13. A flexible sliding panel closure for an aircraft having an opening within a curvilinear surface thereof comprising a flexible metallic outer sheet exposed to the airstream, a corrugated metallic reenforcing element having flattened portions in contact with and attached to said outer sheet along contacting bands in the direction of said corrugations, the said composite panel closure adapted to be flexed about the said contacting bands of the attached portions and to be relatively rigid in directions transverse thereto, mounting means spatially attached along opposite edges of said panel at the ends of said corrugations, tracks having curved portions carried by the aircraft adjacent the opposed edges of said opening engageable by said mounting means whereby said panel may be slid and flexed to follow the curvilinear contour defined by said curved track portions.

ISAAC M. LADDON.
EMRIC BERGER.